3,202,697
PROCESS FOR MAKING CYCLOBUTANE-1,2-DICYANIDE FROM ACRYLONITRILE
James D. Idol, Jr., Shaker Heights, Janice L. Greene, Warrensville Heights, and Nancy R. Gray, Cleveland Heights, Ohio, assignors to The Standard Oil Company, Cleveland, Ohio, a corporation of Ohio
No Drawing. Filed June 21, 1963, Ser. No. 289,727
8 Claims. (Cl. 260—464)

This invention relates to a process for making cyclobutane-1,2-dicyanide from acrylonitrile.

It has been proposed heretofore to convert acrylonitrile to cyclobutane-1,2-dicyanide by heating the acrylonitrile in the liquid phase. The reaction involved can be represented by the following equation:

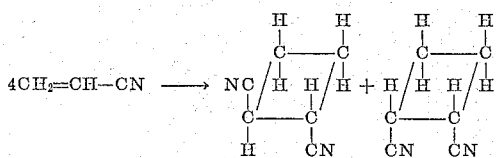

The produce is capable of existing in either the cis or trans geometric isomeric form and both forms are produced by the reaction. They may be readily separated, however, by efficient vacuum fractional distillation.

The formation of cyclobutane-1,2-dicyanide from acrylonitrile is normally accompanied by considerable formation of undesirable polymer. The polymer not only is valueless and results in a lower yield of the wanted product, but it also interferes with the process by fouling the equipment and discoloring the product. The polymer is dark or black and the polymerization is thought to involve a cyclization of the cyano groups as well as chain polymerization, a well-known phenomena of high temperature acrylonitrile polymerization.

In the prior art it has been proposed to minimize polymer formation by using a conventional polymerization inhibitor. Coyner and Hillman (J.A.C.S. 71, 324 (1949)) proposed the use of hydroquinone (HQ) as an inhibitor.

We have discovered in accordance with our invention that if acrylonitrile is heated in the liquid phase at autogenous pressures in the absence of air or oxygen and in the presence of a chelating agent, good conversions of the cyclobutane-1,2-dicyanide can be obtained without, or at least with a minimum of, polymer formation. The unconverted acrylonitrile can be reprocessed so that yields are above 95%.

*Reaction procedure.*—In carrying out our process the acrylonitrile is placed in a stirred autoclave and the chelating agent is added. In some of the experiments to be described a 2-liter, stainless steel autoclave was used and 800 grams of acrylonitrile is charged (referred to hereinafter as the Large Research Autoclave). The autoclave had a gas inlet tube and internal coils by means of which the contents could be heated or cooled. In other experiments a 50 cc. autoclave was employed and 20 grams of acrylonitrile is charged (referred to hereinafter as the Small Research Autoclave). The optimum embodiment of the process has been repeated and confirmed in a 20 gallon autoclave (referred to as a Pilot Plant Autoclave).

In some instances the autoclave was rinsed with a solution of acrylonitrile saturated with the chelating agent and in some runs this appeared to give slightly improved results. The rinsing, however, is an optional procedure.

After the autoclave was sealed, nitrogen gas was passed through the inlet tube until the contents were thoroughly purged of oxygen. The inlet was sealed and the contents brought to reaction temperature and maintained at this temperature under autogenous pressure with stirring for the desired time. The autoclave was then cooled, opened and the contents removed for analysis and the condition of the internal surfaces of the autoclave was noted and rated as described hereinafter. The process can also be carried out continuously in a heated elongated tube to provide the desired residence time.

*Reaction conditions.*—Agitation of the reaction mixture is desirable during the heating because this tends to minimize polymer formation. In experiments in which efficient stirring or mixing have been achieved, yields of polymer have been lower than in comparable experiments without stirring. It is believed that stirring minimizes local zones of superheating in which polymerization is more likely to be initiated and also assures redistribution of dissolved or suspended chelating agent.

*Reaction temperature.*—The temperature of the reaction must be relatively high to achieve reasonable yields in a reasonable time, but with the polymerization inhibited in accordance with the invention the temperature seems to be the only variable affecting the rate of reaction. The minimum practical temperature is in the range of 175–200° C. and the upper temperature is the critical temperature of acrylonitrile, i.e., 246° C. The preferred temperature range is therefore 200–245° C. Because high temperatures in the preferred range favor high reaction rates, a temperature of 240° C. was selected as optimum for the purpose of studying the effect of other variables. The well-known polymerization of acrylonitrile to form the thermal-set black polymer at this temperature dictates the need for effective polymerization inhibition.

*Reaction time.*—The reaction time, or more correctly, the reactor residence time, does not appear to affect the reaction rates or the rate constant but it exerts an effect on the amount of acrylonitrile monomer which can be converted to cyclobutane-1,2-dicyanide before excessive polymerization sets in. It has generally been found that approximately 4 to 9 hours is the maximum reactor residence time would could elapse at the higher preferred temperature range before the polymerization reaction rate accelerates suggesting that the polymerization at this point was being affected by autocatalytic substances which are built up slowly during the course of the reaction. To assure a clean product the reaction preferably should be terminated after 3 to 4 hours when carried out at the higher part of the temperature range over this period of time.

In the Research and Pilot Plant Autoclaves the reaction temperature can be reached very quickly, readily maintained, and quickly cooled. In some large commercial autoclaves it may not be possible to do this and a longer time would be required to heat the contents to the final reaction temperature, as well as slower cooling.

Such a schedule may be as follows:

| Hours: | Temperature (° C.) |
|---|---|
| 0 | Ambient |
| 4 | 115 |
| 8 | 165 |
| 12 | 185 |
| 16 | 200 |
| 20 | 225 |
| 25 | 235 |

In such a run the temperature is above 200° C. for for 9 hours but a good part of this time the contents would be in the lower part of the reaction temperature range. The temperature might not reach the upper limit when the reaction is terminated. Samples can be withdrawn at peridoic intervals and analyzed or inspected, and the reaction terminated when a significant amount of polymer is suspended in the sample. One can expect to obtain at least a 15% conversion to reaction product preferably 20%, with less than a third of that percentage of polymer formation. The relation of temperature and time will be obvious to one skilled in the art in view of the above discussion.

*Amount of chelating agent.*—The amount of chelating agent employed in accordance with this invention may vary from 0.001 to about 1.0% by weight based on the acrylonitrile charged, although larger amounts can be used if desired. As a general rule amounts in the range of 0.01 to 0.5% by weight are preferred for reasons of economy and effectiveness.

*Analytical procedure.*—The contents of the reactor were distilled to separate first the unreacted lower boiling acrylonitrile and then the cyclobutane-1,2-dicyanide isomers. The amount of unreacted acrylonitrile and the reaction product was determined by weight. A simple material balance based on acrylonitrile weight charged versus weight of the cyclobutane-1,2-dicyanide plus unreacted acrylonitrile gave an indication of the amount of undesirable polymer formation. This is expressed in the data hereinafter as material balance in all runs except those in the Small Research Autoclave. The inside of the reactor, the coils, and the reaction mixture were examined visually and photographs of them were taken. On this basis the extent of polymer formation was rated on a scale from 0–10. An unsuccessful run was one in which the conversion to polymer was 100% and was given a rating of 0. A rate of 1–3 was assigned when there was a heavy polymer film and coating on the sides of the coils and a great amount of solid polymer build-up on the bottom of the autoclave and the contents of the reactor were dark and vary viscous. A run with the rating of 4 to 5 contained less polymer on the coils and inside the autoclave and color of the reaction mixture was dark indicating dissolved polymer but not viscous. An experiment considered to be from average to above average had a rating of 6 and was one in which there was some polymer on the coils and some polymer build-up in the bottom of the autoclave, and the reactor contents were still brown. A good experiment indicated by a rating in the range of 7–9 was one in which there was little or no polymer film on the coils, a trace or no polymer in the bottom of the reactor and lttle or no polymer sediment in the reaction mixture. The color of the liquid ranged from a brownish-orange (7) through orange (8), to yellow (9). A perfect run received a rating of 10 in which there was no detectable polymer and the reaction mixture had a color the same as or nearly the same as acrylonitrile charge.

*Chelating agent.*—Any heavy metal chelating agent may be used. There are many known to those skilled in the art. The organic amino-carboxylic acids and their salts containing in relation to one basic nitrogen, at least one carboxylic group, were selected as illustrative for the purpose of studying the other variables, but other equivalent chelating agents can be used. Compounds of the preferred type may be defined by the following structural formula:

$$R-\underset{\underset{R'}{|}}{N}-(CH_2)_n-COOX \qquad (I)$$

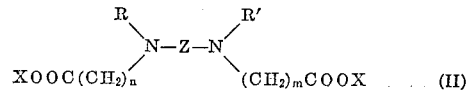

In the above formula, Z represents an alkylene group of 2 to 4 carbon atoms such as $-C_2H_4-$,

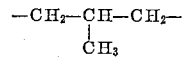

and $-C_4H_8-$ or a cycloalkyl group of 3 to 6 carbon atoms such as 1,2-cyclohexane and 1,2- or 1,3-cyclobutane or a single carbocyclic aromatic nucleus or condensed nucleus carbocyclic aromatic group such as 1,2-benzene. m and n are integers of from 1 to 4. X is hydrogen or any cation normally forming a salt with a carboxylic group such as ammonium, alkali metals such as sodium, potassium and lithium, or amines. R and R' are radicals selected from the group consisting of hydrogen and alkyl groups containing from 1 to 5 carbon atoms, hydroxy-substituted derivatives thereof, and $-(CH_2)_mCOOX$, where m and X are as previously defined. Compounds representative of Formula I include amino ethyl-N, N-dipropionic acid, aminoisopropyl-N, N-diacetate, diaminoethyl-N, N-monoacetate, aminohydroxyethyl-N, N-diacetate. The preferred compounds corresponding to Formula I are nitrilo triacetic acid (NTA) and the mono di- and tri- alkali metal salt thereof, especially the sodium salts (NTA Na, NTA Na$_2$, and NTA Na$_3$). Compounds representative of Formula II are 1,2-diaminopropane-N,N,N',N'-tetrapropionic acid, 1,3-diamino-2-propanol-tetraacetic acid, N'-(2-hydroxyethyl) ethylenediamine - N,N,N'-triacetic acid, 1,2 - diaminobutane N,N,N',N'-tetraacetic acid, and 2,3-diaminobutane-N,N,N',N'-tetraacetic acid, 1,2-diaminocyclopentane-N,N,N',N'-tetraacetic acid, disodium 1,2-diaminocyclohexane-N,N,N',N'-tetraacetic acid, 1,2 - diaminobenzene-N,N,N',N'-tetraacetic acid, 3,4-diaminodiphenyl-N,N,N',N' - tetraacetic acid, dihydroxyethyl-ethylenediamine dibutyric acid, tri-hydroxypropyl-propylene diaminopropionic acid, etc. The preferred compound corresponding to Formula II is ethylenediamine tetraacetic acid (EDTA) and especially the mono di- and tri- alkali metal salts thereof, particularly the sodium salts (EDTA Na, EDTA Na$_2$, and EDTA Na$_3$). Mixtures of any of the above compounds may also be used.

As illustrative of the effect of oxygen, the following runs were carried out in the Small Research Autoclave with the following results:

*Table I*

| Run No. | Inhibitor | Amount, percent | Nitrogen Purge | Time, hrs. | Temp., ° C. | Conversion, percent | Polymer rating |
|---|---|---|---|---|---|---|---|
| 1 | None | | No | 4 | 240 | 15.7 | 3 |
| 2 | None | | Yes | 4 | 240 | 18.0 | 5 |
| 3 | EDTA Na$_2$ | 0.05 | No | 4 | 240 | 15.3 | 4 |
| 4 | EDTA Na$_2$ | 0.05 | Yes | 4 | 240 | 14.8 | 8 |
| 5 | EDTA Na$_3$ | 0.05 | No | 4 | 240 | 14.9 | 4 |
| 6 | EDTA Na$_3$ | 0.05 | Yes | 4 | 240 | 17.4 | 9 |
| 7 | EDTA Na$_4$ | 0.05 | Yes | 3 | 240 | 7 | 1 |

Run No. 1 shows that in the presence of oxygen, and in the absence of an inhibitor, there is excessive polymer formation. Run No. 2 shows that under the same conditions, but in the absence of oxygen, there is some improvement but the polymer formation is still too great to be satisfactory. Runs Nos. 3 and 5 show that the di- and tri-sodium salts of ethylenediamine tetraacetic acid, in the presence of oxygen, have little effect in inhibiting polymerization. Runs Nos. 4 and 6 in accordance with the invention, have good polymer ratings, showing that it is essential to have the inhibitor as well as the absence of oxygen. Run No. 7 shows that the tetra-sodium salt of ethylenediamine tetraacetic acid, by itself, is not suitable.

The effect of the rinse is shown in the next table:

of ethylenediamine tetraacetic acid (EDTA $Na_2$)—as HQ in Run No. 11—gives an excellent polymer rating and a better conversion. Run No. 12 shows a smaller amount of EDTA $Na_2$ and gives about the same results as the larger amount. Run No. 14 shows that the tri-sodium salt of ethylenediamine tetraacetic acid gives only slightly poorer results in polymer rating, but gives an improved conversion. This suggests that a mixture of the di- and tri- salts will be optimum considering both conversion and polymer formation.

Other data showing the effect of other inhibitors is contained in the next table:

*Table IV*

| Run No. | Inhibitor | Amount, percent | Nitrogen purge | Time, hrs. | Temp., °C. | Conversion, percent | Material Balance, percent | Polymer rating |
|---------|-----------|-----------------|----------------|------------|------------|---------------------|---------------------------|----------------|
| 16 | EDTA | 0.05 | Yes | 3 | 240 | 16.2 | 91.5 | 3 |
| 12 | EDTA $Na_2$ | 0.05 | Yes | 3 | 240 | 17.0 | 97.6 | 9 |
| 14 | EDTA $Na_3$ | 0.05 | Yes | 3 | 240 | 22.5 | 97.8 | 8 |
| 7 | EDTA $Na_4$ | 0.05 | Yes | 3 | 240 | 7 | | 1 |
| 17 | NTA | 0.05 | Yes | 3 | 240 | 17.4 | 93 | 4 |
| 18 | NTA $Na_2$ | 0.05 | Yes | 3 | 240 | 20.4 | 96.7 | 7 |
| 15 | NTA $Na_3$ | 0.05 | Yes | 3 | 240 | 19.2 | 96.8 | 9 |
| 19 | EDTA * + EDTA $Na_4$ | 0.05 | Yes | 3 | 240 | 16.5 | 94.0 | 8 |
| 20 | EDTA * + EDTA $Na_2$ | 0.05 | Yes | 3 | 240 | 15.3 | 91.0 | 7 |
| 21 | NTA * + NTA $Na_3$ | 0.05 | Yes | 3 | 240 | 16.4 | 98.5 | 9 |

* Equal molal mixtures.

A comparison of Runs Nos. 12 and 14 with Runs Nos. 16 and 7 show that the free ethylene-diamine tetraacetic acid and the tetra-sodium salt are less effective as com-

*Table II*

| Run No. | Inhibitor | Amount, percent | Nitrogen purge | Rinse | Time hrs. | Temp., °C. | Conversion, percent | Material balance, percent | Polymer rating |
|---------|-----------|-----------------|----------------|-------|-----------|------------|---------------------|---------------------------|----------------|
| 8 | EDTA $Na_2$ | 0.05 | Yes | No | 3 | 240 | 17.9 | 97.3 | 8 |
| 9 | EDTA $Na_2$ | 0.05 | Yes | Yes | 3 | 240 | 17.0 | 97.6 | 9 |

A comparison of Runs Nos. 8 and 9 shows that the rinse improves the material balance slightly and improves the polymer rating by one number, but reduces the conversion. Taking all things into account, rinsing seems not to be an essential feature. It was thought that if the function of the chelating agent was to chelate any metal ions coming from the surface of the autoclave, the presence of the chelating agent on the surface would assure the performance of this function. However, in view of the results it seems doubtful that the only function of the chelating agent is to chelate metal ions.

The effect of the inhibitor utilized by the prior art in comparison with the invention is shown in the following table in which the runs were made in the Large Research Autoclave:

pared with the di- and tri- sodium salts. Runs Nos. 19 and 20 show that a mixture of the free acid with the tetra- and di- salt, respectively, gives reasonably good results. Run No. 19, when compared with Runs Nos. 16 and 7, is especially surprising. This indicates that the salts of ethylenediamine tetraacetic acid having 1 to 3 acid hydrogens replaced by a cation are optimum. Run No. 18 shows that the di- salt of nitrilo triacetic acid is not quite as effective in inhibiting polymer formation as the corresponding tri- salt. However, Run No. 21 shows that a mixture of the free nitrilo triacetic acid and the tri- salt (having an average of 1½ cations) is more effective in preventing polymer formation than the di- salt, but does not give as good conversion as either the di- or tri- salt. This indicates that salts of nitrilo

*Table III*

| Run No. | Inhibitor | Amount, Percent | Nitrogen purge | Time, hrs. | Temp., °C. | Conversion, Percent | Material balance, percent | Polymer rating |
|---------|-----------|-----------------|----------------|------------|------------|---------------------|---------------------------|----------------|
| 10 | None | | Yes | 3 | 240 | 18.1 | 89.5 | 4 |
| 11 | HQ | 0.1 | Yes | 3 | 240 | 12.8 | 93.2 | 6 |
| 12 | EDTA $Na_2$ | 0.05 | Yes | 3 | 240 | 17.0 | 97.6 | 9 |
| 13 | EDTA $Na_2$ | 0.1 | Yes | 3 | 240 | 16.8 | 97.5 | 9 |
| 14 | EDTA $Na_3$ | 0.05 | Yes | 3 | 240 | 22.5 | 97.8 | 8 |
| 15 | NTA $Na_3$ | 0.05 | Yes | 3 | 240 | 19.2 | 96.8 | 9 |

It will be seen in Table III from a comparison of Runs Nos. 10 and 11 that hydroquinone (HQ) improves the polymer rating somewhat, but lowers the conversion as compared with a similar run without HQ. Run No. 13, employing the same amount of the di-sodium salt triacetic acid in which from 1 to 3 acid hydrogens are replaced by a cation are optimum.

In the above mixtures the amounts are equal molal, but this relation is not essential. For example, the free acid and the salts above mentioned may be used in any proportion to provide the average number of cations heretofore indicated.

It will be understood that any of the conventional techniques in operating autoclaves and in working up the products may be employed as is obvious to one skilled in the art.

We claim:

1. A process of forming cyclobutane-1,2-dicyanide which comprises heating liquid acrylonitrile to a temperature of 175 to 246° for from about 3 to 9 hours under autogenous pressure in the absence of oxygen and in the presence of from 0.001 to 1% by weight of a chelating agent selected from the group consisting of compounds having the structure

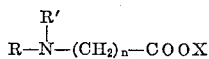

and

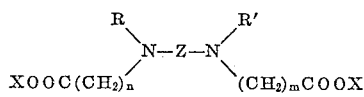

wherein Z is a member selected from the group consisting of an alkylene group having from 2 to 4 carbon atoms, a cycloalkyl group having from 3 to 6 carbon atoms, a single carbocyclic aromatic nucleus and a condensed carbocyclic aromatic nucleus; $m$ and $n$ are integers of from 1 to 4; X is a member of the group consisting of hydrogen, ammonium and an alkali metal; and R and R' are radicals selected from the group consisting of hydrogen and alkyl groups having from 1 to 5 carbon atoms and $-(CH_2)_m COOX$ wherein $m$ and X have the foregoing designations.

2. The process of claim 1 in which the chelating agent is a mixture of ethylenediamine tetraacetic acid and the alkali metal salt thereof to provide an average of 1 to 3 cations.

3. The process of claim 1 in which the chelating agent is the alkali metal salt of nitrilo triacetic acid.

4. The process of claim 1 in which the chelating agent is a mixture of nitrilo triacetic acid and the alkali metal salt thereof to provide an average of 1 to 3 alkali metal cations.

5. The process of claim 1 in which the chelating agent is the alkali metal salt of ethylenediamine tetraacetic acid.

6. The process of claim 5 in which the salt has an average of from 1 to 3 alkali metal cations.

7. A process of forming cyclobutane-1,2-dicyanide which comprises heating acrylonitrile to a temperature of 200 to 245° C. under autogenous pressure in the absence of oxygen and in the presence of from 0.01 to 0.1% by weight of the sodium salt of ethylenediamine tetraacetic acid having from 2 to 3 sodium atoms.

8. A process of forming cyclobutane-1,2-dicyanide which comprises heating acrylonitrile to a temperature of 200 to 245° C. under autogenous pressure in the absence of oxygen and in the presence of from 0.01 to 0.1% by weight of the sodium salt of nitrilo triacetic acid having 2 to 3 sodium atoms.

References Cited by the Examiner

FOREIGN PATENTS 897,275   5/62   Great Britain.

CHARLES B. PARKER, *Primary Examiner.*